US012534910B2

(12) United States Patent
Langer

(10) Patent No.: US 12,534,910 B2
(45) Date of Patent: Jan. 27, 2026

(54) FASTENER SYSTEM AND METHOD

(71) Applicant: Norse Inc., Torrington, CT (US)

(72) Inventor: Alfred C. Langer, New Milford, CT (US)

(73) Assignee: Norse Inc., Torrington, CT (US)

( * ) Notice: Subject to any disclaimer, the term of this patent is extended or adjusted under 35 U.S.C. 154(b) by 637 days.

(21) Appl. No.: 17/159,935

(22) Filed: Jan. 27, 2021

(65) Prior Publication Data

US 2021/0230867 A1 Jul. 29, 2021

Related U.S. Application Data

(60) Provisional application No. 62/966,223, filed on Jan. 27, 2020.

(51) Int. Cl.
*E04B 1/61* (2006.01)
*E04B 2/74* (2006.01)

(52) U.S. Cl.
CPC .......... *E04B 2/7401* (2013.01); *E04B 1/6183* (2013.01); *E04B 2002/7466* (2013.01)

(58) Field of Classification Search
CPC .......... E04B 1/6183; E04B 2001/6195; E05B 65/0817; F16B 5/0092; F16B 12/2009; F16B 12/2027; E05C 3/045
USPC .......... 292/65, 111; 52/127.9, 127.11, 582.2; 403/322.1, DIG. 12
See application file for complete search history.

(56) References Cited

U.S. PATENT DOCUMENTS 659,069 A * 10/1900 Ives ...................... E05C 19/105
                                              292/204
1,350,713 A * 8/1920 Ferdon .................... E05C 19/14
                                              292/DIG. 14

(Continued)

FOREIGN PATENT DOCUMENTS

DE      20208021 U1 * 8/2002  .......... E04B 1/6183
EP      2899482 A1 * 7/2015   .......... F25D 23/063
GB      2309252 A  * 7/1997   ............ E05C 19/14

OTHER PUBLICATIONS

International Search Report and Written Opinion issued in International Application No. PCT/US21/15325 on Apr. 21, 2021, 13 pages.

*Primary Examiner* — Ryan D Kwiecinski
(74) *Attorney, Agent, or Firm* — McCarter & English, LLP

(57) ABSTRACT

A fastening system for joining a first structural member end-on to a second structural member is provided. The fastening system includes a latching device comprising at least one eccentric rotatable part and at least one generally S shaped latch spring hook joined to the rotatable part, and a receiver having at least one hole configured to receive a free end of the latch spring hook. The latching device is fixed to an end of a first structural member and the receiver is fixed to a side of a second structural member. The first structural member may be joined end-on to the second structural member by positioning the latching device on the first structural member adjacent to the receiver of the second structural member and rotating the rotatable part to cause the free end of the latch spring hook to engage the hole in the receiver. Further rotation of the eccentric rotatable part causes the latch spring hook to exert a pulling force, thereby joining the structural members together.

32 Claims, 8 Drawing Sheets

(56) References Cited

U.S. PATENT DOCUMENTS

| | | | | |
|---|---|---|---|---|
| 1,517,995 | A * | 12/1924 | Langenau | E05B 65/0817 292/113 |
| 2,378,654 | A * | 6/1945 | Pekny | E05B 65/0817 292/124 |
| 2,647,287 | A * | 8/1953 | Jones | E04B 1/34321 D25/33 |
| 2,714,751 | A * | 8/1955 | Stuart | F16B 12/20 403/321 |
| 2,741,341 | A * | 4/1956 | Anderson | F25D 23/063 292/109 |
| 3,019,043 | A * | 1/1962 | Woodworth | E05B 65/0817 292/113 |
| 3,140,889 | A * | 7/1964 | Sanders | E05B 65/0817 292/DIG. 46 |
| 3,191,244 | A * | 6/1965 | Burke | E05B 65/0817 52/DIG. 1 |
| 3,309,115 | A * | 3/1967 | Langer | E04B 2/74 52/DIG. 1 |
| 3,327,447 | A * | 6/1967 | Nissley | F25D 23/063 52/582.2 |
| 3,353,314 | A * | 11/1967 | Melcher | E04B 1/6183 52/794.1 |
| 3,365,223 | A * | 1/1968 | Bisbing | E05B 65/0817 292/65 |
| 3,392,497 | A * | 7/1968 | Cushman | E04B 1/6183 D25/33 |
| 3,400,958 | A * | 9/1968 | Haimes | E05B 65/0817 52/309.14 |
| 3,437,363 | A * | 4/1969 | Walters | E05B 65/0817 292/113 |
| 3,437,364 | A * | 4/1969 | Walters | E05B 65/0817 292/113 |
| 3,472,545 | A * | 10/1969 | Berkowitz | E04B 1/6183 292/111 |
| 3,484,832 | A * | 12/1969 | Langer | E05B 65/0817 292/111 |
| 3,496,692 | A * | 2/1970 | Melcher | E04B 1/6183 52/583.1 |
| 3,528,690 | A * | 9/1970 | Langer | E05B 65/0817 52/582.2 |
| 3,565,469 | A * | 2/1971 | Zwart | E04B 1/6183 52/582.2 |
| 3,647,251 | A * | 3/1972 | Brown | E05B 65/0817 292/DIG. 60 |
| 3,661,410 | A * | 5/1972 | Larson | E05B 65/0817 52/582.2 |
| 3,712,653 | A * | 1/1973 | Lehmann | E04B 1/6183 292/65 |
| 3,784,240 | A * | 1/1974 | Berkowitz | E04B 1/6183 403/326 |
| 3,806,174 | A * | 4/1974 | Herman | E05C 19/14 292/113 |
| 3,830,705 | A * | 8/1974 | Dewegeli | B01D 3/02 202/83 |
| 4,020,613 | A * | 5/1977 | Reynolds | E05B 65/0817 403/321 |
| 4,021,064 | A * | 5/1977 | Kruzan | E05B 65/0817 292/65 |
| 4,065,161 | A * | 12/1977 | MacMaster | E04B 1/6183 292/113 |
| 4,160,610 | A * | 7/1979 | Austin-Brown | F16B 12/2027 403/231 |
| 4,223,500 | A * | 9/1980 | Clark | E04C 2/384 52/800.1 |
| 4,326,739 | A * | 4/1982 | Schlueter | E05C 19/14 292/DIG. 49 |
| 4,392,281 | A * | 7/1983 | Metz | E05B 65/0817 292/111 |
| 4,417,430 | A * | 11/1983 | Loikitz | F25D 23/065 52/582.2 |
| 4,502,807 | A * | 3/1985 | Salice | E05C 19/10 403/231 |
| 4,507,010 | A * | 3/1985 | Fujiya | E04B 1/6183 403/323 |
| 4,512,122 | A * | 4/1985 | Berkowitz | E04B 1/6183 292/DIG. 53 |
| 4,664,548 | A * | 5/1987 | Brinkmann | F16B 12/2027 403/231 |
| 4,804,215 | A * | 2/1989 | Bisbing | E05C 19/14 292/113 |
| 4,930,931 | A * | 6/1990 | Matsui | F16B 12/2027 403/231 |
| 5,257,839 | A * | 11/1993 | Nielsen | E05C 19/14 292/205 |
| 5,424,118 | A * | 6/1995 | McLaughlin | E05C 3/004 428/318.6 |
| 5,452,925 | A * | 9/1995 | Huang | E05B 65/0817 292/65 |
| 5,667,261 | A * | 9/1997 | Weinerman | E05C 19/14 292/113 |
| 6,018,920 | A * | 2/2000 | Fancher | E04B 1/6187 52/127.9 |
| 6,041,721 | A * | 3/2000 | Weston | E05C 19/14 108/65 |
| 6,070,919 | A * | 6/2000 | Finkelstein | E05B 65/0817 292/241 |
| 6,079,754 | A * | 6/2000 | Alexy | E04B 1/6183 292/202 |
| 6,119,427 | A * | 9/2000 | Wyman | E04C 2/292 52/584.1 |
| 6,386,788 | B1 * | 5/2002 | Finkelstein | F16B 5/0084 403/283 |
| 6,409,235 | B1 * | 6/2002 | Finkelstein | E05C 3/045 292/210 |
| 6,478,347 | B1 * | 11/2002 | Timothy | E05C 3/046 292/241 |
| 6,626,017 | B2 * | 9/2003 | Herbeck | F16B 2/18 312/265.5 |
| 7,007,321 | B2 * | 3/2006 | Polevoy | F16B 12/56 5/301 |
| D541,628 | S * | 5/2007 | Arthurs | D8/331 |
| 7,716,895 | B2 * | 5/2010 | Fairorth | E04H 3/28 472/75 |
| 8,186,189 | B2 * | 5/2012 | Brisco | E05B 5/00 70/99 |
| 8,240,942 | B2 * | 8/2012 | Baur | F16B 12/2036 403/321 |
| 8,434,797 | B2 * | 5/2013 | Langer | E06B 9/02 292/241 |
| 8,528,288 | B1 * | 9/2013 | Kinser, Jr. | E04C 2/292 52/584.1 |
| 8,776,472 | B1 * | 7/2014 | Kinser, Jr. | E04B 1/80 52/584.1 |
| 9,803,403 | B2 * | 10/2017 | Finkelstein | F16B 5/0004 |
| 9,863,143 | B2 * | 1/2018 | Finkelstein | E04B 1/6183 |
| 10,450,009 | B2 * | 10/2019 | Yamamoto | E05B 65/006 |
| 10,711,490 | B2 * | 7/2020 | Zhang | F16B 5/0092 |
| 10,745,905 | B2 * | 8/2020 | Hodson | E04B 1/34321 |
| 10,865,592 | B2 * | 12/2020 | Liang | E05C 3/16 |
| 11,118,376 | B1 * | 9/2021 | Liang | E06B 3/5063 |
| 11,339,819 | B2 * | 5/2022 | Yao | F16B 12/2009 |
| 11,408,666 | B2 * | 8/2022 | Yao | F25D 23/063 |
| 11,486,132 | B2 * | 11/2022 | Gottschling | E04B 1/6116 |
| 11,549,534 | B2 * | 1/2023 | Meyer | F16B 2/18 |
| 11,656,021 | B2 * | 5/2023 | Shibuya | E04B 1/6183 312/405 |
| 2003/0011192 | A1 * | 1/2003 | Herbeck | F16B 2/18 285/80 |
| 2010/0043346 | A1 | 2/2010 | Lancer | |
| 2015/0211267 | A1 | 7/2015 | Finkelstein | |
| 2017/0081848 | A1 * | 3/2017 | Finkelstein | F25D 13/00 |
| 2017/0121961 | A1 * | 5/2017 | Hodson | E04B 1/34321 |
| 2020/0200202 | A1 * | 6/2020 | Meyer | F16B 5/0084 |
| 2021/0230860 | A1 * | 7/2021 | Langer | E04B 2/58 |
| 2021/0230867 | A1 * | 7/2021 | Langer | E04B 1/5818 |

(56) References Cited

U.S. PATENT DOCUMENTS

2021/0293015 A1\* 9/2021 Gottschling ............ E04B 1/388
2023/0167636 A1\* 6/2023 Keller ....................... E04B 1/14
                                                              52/91.3

\* cited by examiner

FASTENER SYSTEM AND METHOD

This application claims priority under 35 U.S.C. § 119 (e) to U.S. Provisional Application Ser. No. 62/966,223 filed on Jan. 27, 2020, the entire contents of which are hereby incorporated by reference.

FIELD OF THE INVENTION

The invention relates generally to fastening systems and methods for quick, easy and secure fastening together of two or more components, such as structural members.

BACKGROUND

It is desirable to join two components, such as structural members, together in a quick but secure fashion. In the case of structural members, such as those used to construct buildings, frames and other structures, various joining mechanisms have long been known, including fasteners such as nails, screws, and rivets, and adhesives such as glues. Certain materials such as metals and plastics may be joined by welding or by other types of application of heat. However, such methods can be time-consuming, require specialized tools, or require highly specialized skills to perform correctly.

The present inventor has invented several latch/receiver fasteners in which a latch is attached to one component, a receiver is attached to another component, and, by use of a simple tool, the latch can engage the receiver and connect the two components together. Examples of these inventions are shown in U.S. Pat. Nos. 3,309,115, 3,484,832, and 8,434,797, which are incorporated by reference in their entirety.

Such fasteners have been used, for example, to join metal stud sections in parallel arrangements as seen in FIGS. 1A and 1B. As seen in FIG. 1A, latch component 110 is attached to metal stud section 115 and receiver component 120 is attached to metal stud section 125. Latch 110 has a latch spring hook that engages receiver 120 to secure the metal stud sections 115, 125 together.

The metal studs 115, 125 also include respective further receiver components 130, 135. Metal stud section 140 includes two latch spring hooks 145 and 150. When latch spring hooks 145, 150 engage the receiver components 130, 135, the metal stud 140 is secured to metal studs 115 and 125 as seen in FIG. 1B.

While the latch and receiver system described above allows structural members such as metal studs to be securely fastened together, it does not allow a first structural member to be joined end-on to a second structural member. It would be desirable to have a latch and receiver fastening system for joining two components, such as two structural members in an end-on manner.

SUMMARY

It is an object of the present invention to provide fasteners and fastener systems to join two components such as two metal structural members with a first structural member joined end-on to a second structural member.

It is a further object of the present invention to provide methods of joining two components such as two metal structural members with a first structural member joined end-on to a second structural member.

A still further object of the present invention is to provide fastener systems and methods of joining metal structural members in a relatively quick manner.

Yet another object of the present invention is to provide that the joined metal structural members can be disassembled from each other in a relatively quick manner.

In one embodiment, the fastening system comprises a latching device having at least one latch spring hook attached to an eccentric rotatable part mounted on a first component and a receiver mounted on a second component. In one embodiment, the components are structural members such as metal studs. The latch and receiver are complementarily designed and mounted on the respective members so that the latch spring hook will engage holes on the receiver when the rotatable part is rotated and exert a clamping force upon further rotation of the rotatable part. The fastening system allows the structural members to be joined in an "end-on" manner in which an end of the first structural member is fastened to a side of the second structural member.

In one embodiment, the latching device comprises a plurality of eccentric rotatable parts and latch spring hooks, and the receiver comprises a plurality of holes configured to receive the plurality of latch spring hooks.

In another embodiment, the plurality of eccentric rotatable parts are joined by an axle.

In another embodiment, the receiver further comprises tabs configured to guide the first structural member into alignment with the second structural member such that the at least one latch spring hook on the first structural member engages corresponding holes in the receiver on the second structural member to fasten the first structural member to the second structural member.

In another embodiment, the receiver further comprises a base portion and a metal plate joined to the base portion by a pivot wherein the metal plate has openings to receive the at least one latch spring latch spring hook.

In another embodiment for attaching the first structural member to the second structural member at an angle, the receiver comprises a base portion for attachment to a structural member and a metal plate fixedly attached to the base portion having openings to receive the at least one latch spring hook. The metal plate is angled on the side attached to the base portion to orient the metal plate and the openings at any desired angle relative to the structural member.

In another embodiment, the present invention provides a method for fastening a first structural member to a second structural member comprising the steps of (a) providing a first structural member having at least one latching device mounted on the first structural member, wherein the at least one latching device comprises at least one eccentric rotatable part and at least one latch spring hook having a first end attached to the at least one rotatable part, (b) providing a second structural member having at least one receiver mounted on the second structural member, wherein the receiver comprises a plate having holes configured to receive a second end of the latch spring hooks and wherein the latching device and the receiver are configured such that an end of the first structural member may be fastened to a side of the second structural member, (c) aligning the first structural member and the second structural member such that the latch spring hooks are aligned with the holes in the receiver, (d) rotating the rotatable parts such that the second end of the latch spring hooks engage the corresponding holes in the receiver, and (e) further rotating the rotatable parts such that the latch spring hooks exert a retractive force on the receiver, thereby securing the first structural member to the second structural member.

In another embodiment of the method, the latching device comprises a plurality of eccentric rotatable parts and latch spring hooks, and the receiver comprises a plurality of holes configured to receive the plurality of latch spring hooks.

In yet another embodiment of the method, the rotatable parts are rotated by inserting a rotating tool in the center of the rotatable parts.

In yet another embodiment of the method, the eccentric rotatable parts are joined by an axle and the rotatable parts are rotated by inserting a tool in the axle.

In yet another embodiment of the method, the receiver further comprises tabs configured to guide the first structural member into alignment with the second structural member such that the at least one latch spring hook on the first structural member engages corresponding holes in the receiver on the second structural member to fasten the first structural member to the second structural member.

In yet another embodiment of the method, the receiver further comprises a base portion and a metal plate joined to the base portion by a pivot wherein the metal plate has openings to receive the at least one latch spring latch spring hook.

In another embodiment of the method for attaching the first structural member to the second structural member at an angle, the receiver comprises a base portion for attachment to a structural member and a metal plate fixedly attached to the base portion having openings to receive the at least one latch spring hook. The metal plate is angled on the side attached to the base portion to orient the metal plate and the openings at any desired angle relative to the structural member.

These and other advantages of the invention will become more readily apparent in view of the following detailed description of certain embodiments and accompanying drawings.

This summary is not exhaustive of the scope of the aspects and embodiments of the invention. Thus, while certain aspects and embodiments have been presented and/or outlined in this summary, it should be understood that the inventive aspects and embodiments are not limited to the aspects and embodiments in this summary. Indeed, other aspects and embodiments, which may be similar to and/or different from, the aspects and embodiments presented in this summary, will be apparent from the description, illustrations and/or claims, which follow, but in any case are not exhaustive or limiting.

It should also be understood that any aspects and embodiments that are described in this summary and elsewhere in this application and do not appear in the claims that follow are preserved for later presentation in this application or in one or more continuation patent applications.

BRIEF DESCRIPTION OF THE DRAWINGS

Exemplary embodiments, which are understood not to be limiting, are described in greater detail hereafter with reference to the drawings.

DETAILED DESCRIPTION

The present invention is directed to fasteners and fastening systems for attaching two components together. In one embodiment, the components are structural members such as metal studs. The fastening system of the present invention allows the end of a first structural member to be attached to a second structural member in an end-on or "T" type of configuration wherein the first structural member is perpendicular to the second structural member. Alternatively, the first structural member may be attached at a non-perpendicular angle to the second structural member.

The fastening system of the present invention comprises a latching device having at least one latch spring hook attached to an eccentric rotatable part mounted on a first component and a receiver mounted on a second component. In one embodiment, the components are structural members such as metal studs. The latch and receiver are complementarily designed and mounted on the respective members so that at least one latch spring hook will pass through corresponding holes in the receiver upon rotation of the rotatable part and then engage the receiver with clamping force upon further rotation of the rotatable part.

Figure 1A:
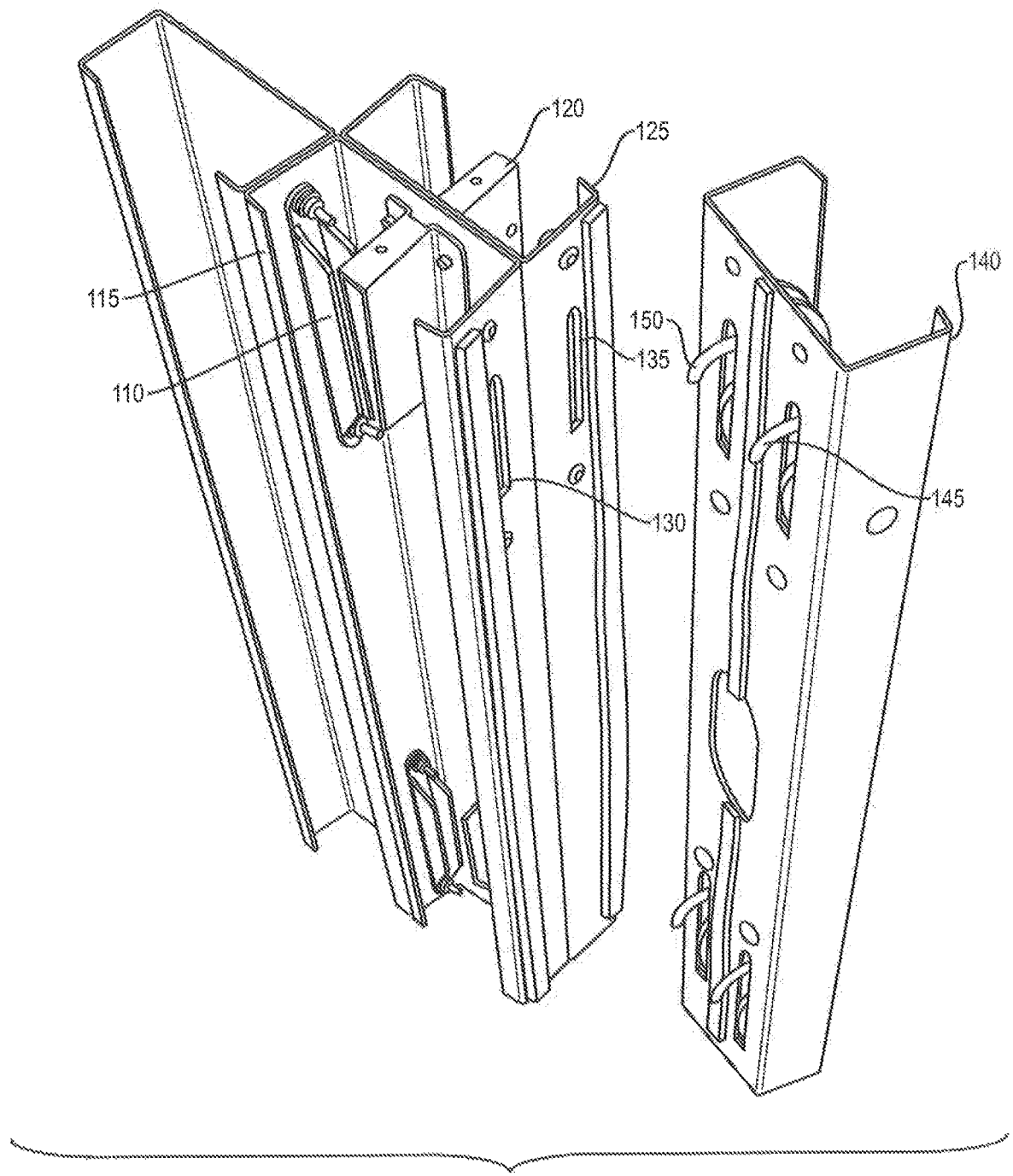
FIG. 1A is a perspective view of metal studs that are joined to each other using a prior art latch and receiver.
Figure 1B:
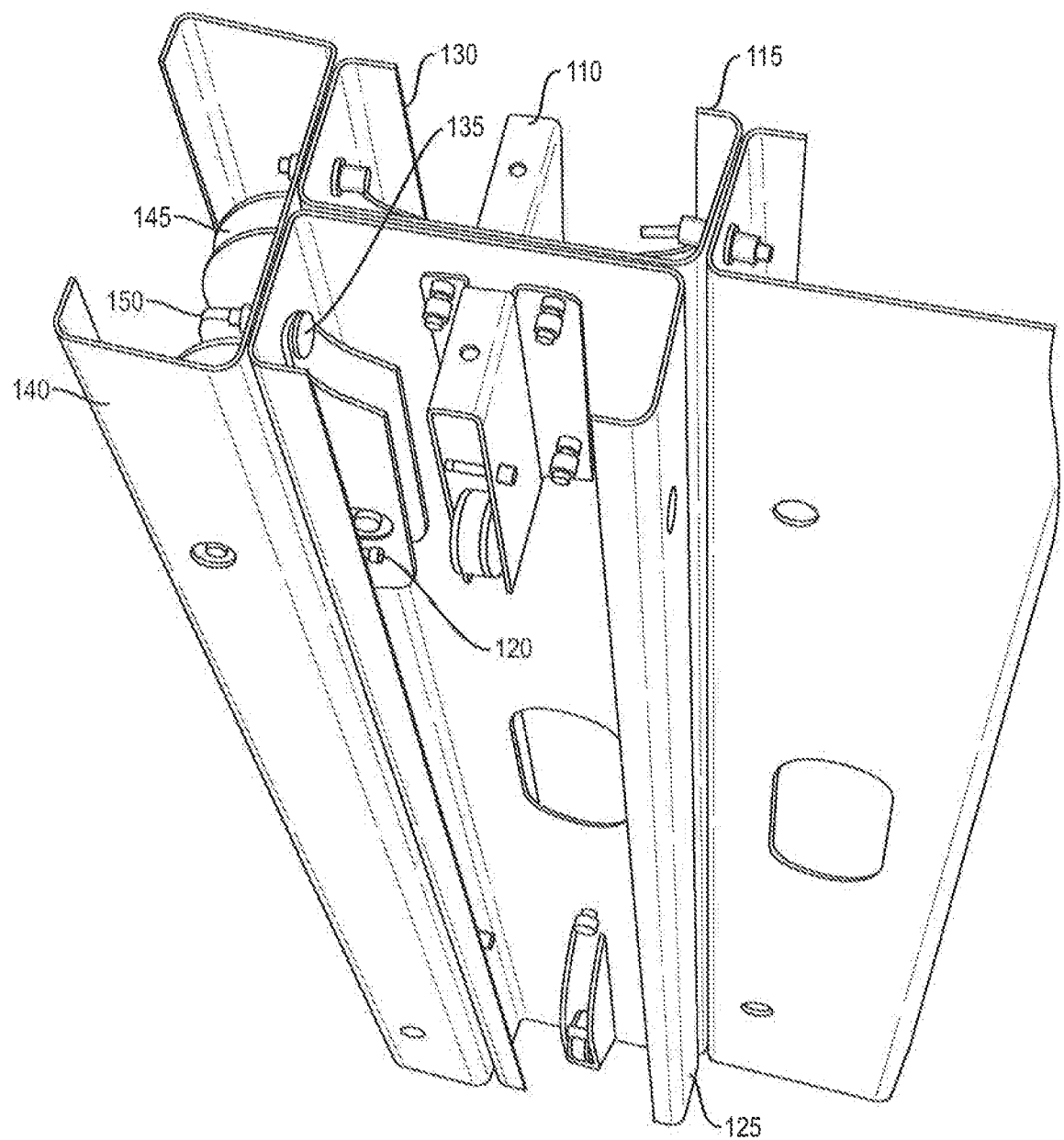
FIG. 1B is a perspective view of an additional metal stud joined to the structure of FIG. 1A using an additional prior art latch and receiver.
Figure 2:
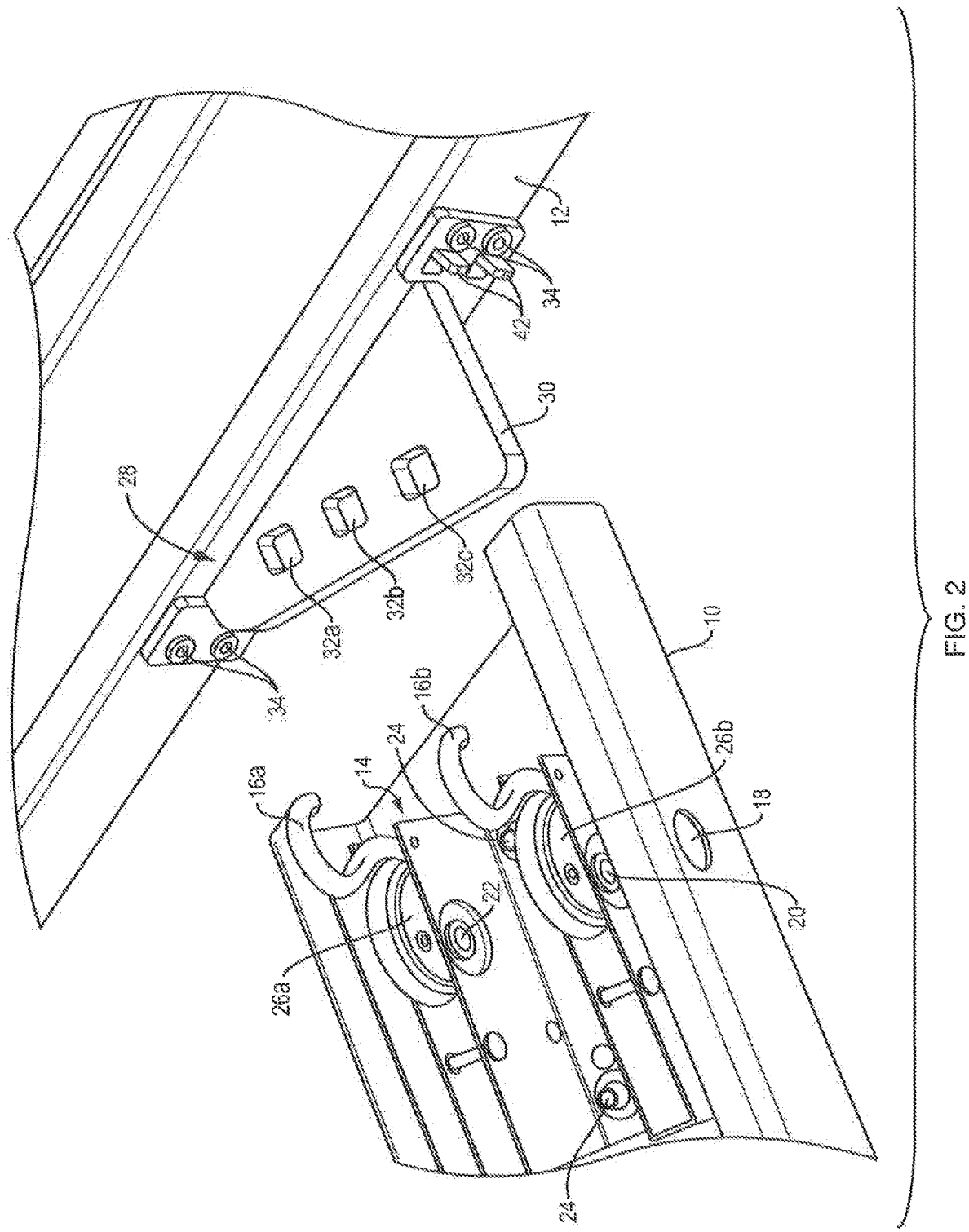
FIG. 2 is a top view of an embodiment of a latching mechanism fastened to a first structural member and a receiver fastened to a second structural member with the latching mechanism in the disengaged position.

Referring to FIG. 2, a latching device 14 is fixedly attached to a first structural member 10. The latching device 14 may be attached to the first structural member 10 using any appropriate means, such as screws, welds or rivets. In the embodiment shown in FIG. 2, the latching device 14 is attached to the first structural member 10 by rivets 24.

Figure 3:
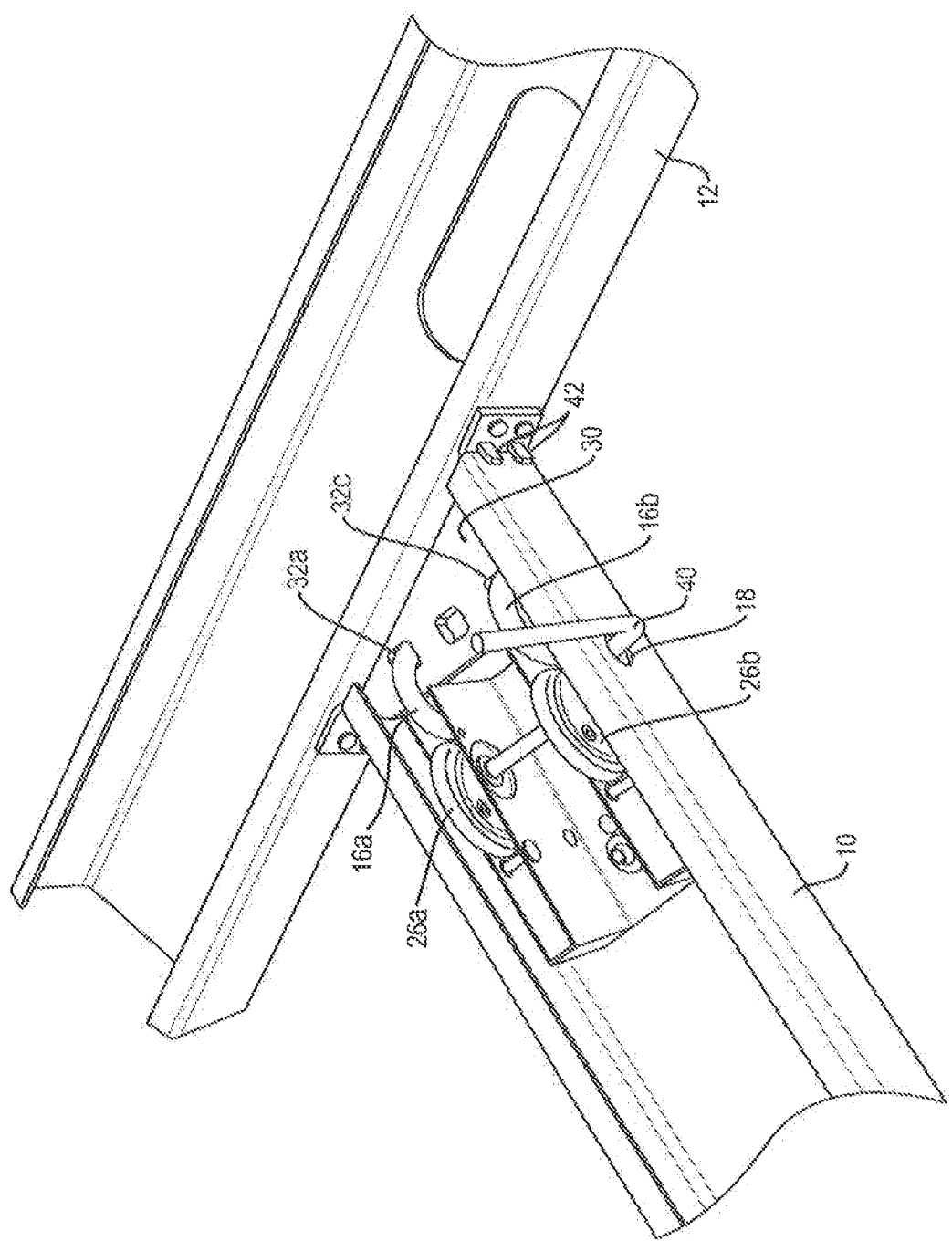
FIG. 3 is a top view of the structural members of FIG. 2 with the latching mechanism in the engaged position.

Latching device 14 includes at least one generally S shaped latch spring hook 16. In the embodiment shown in FIG. 2, the latching device has two latch spring hooks 16a, 16b which increases both the strength and the stability of the connection between the structural members. The latch spring hooks 16a, 16b are controlled by rotatable parts 26a, 26b that eccentrically rotate. In the embodiment shown in FIG. 2, the rotatable parts 26a, 26b include operating means 20, 22, such as a hole having a shape corresponding to the shape of an operating tool. The structural member 10 includes a hole 18 for insertion of an operating device into the operating means of the rotatable parts 26a, 26b. As seen in FIG. 2, the operating means of each rotatable part are aligned, so that, as seen in FIG. 3, a single operating tool 40 can be inserted through both axles to rotate both latch spring hooks simultaneously. In another embodiment, an axle (not shown) is provided joining rotatable parts 26a, 26b and the operating means is inserted in the axle.

Figure 4:
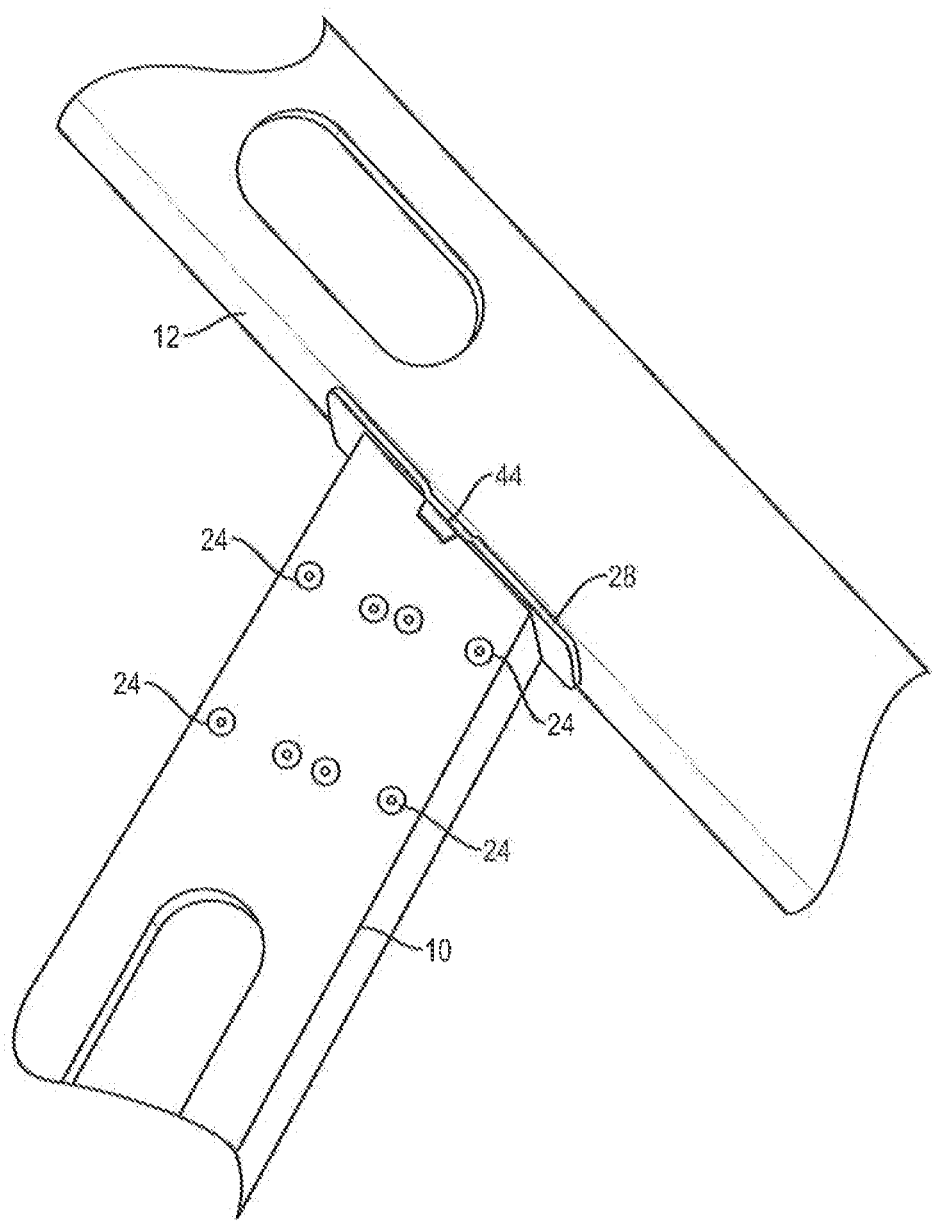
FIG. 4 is a rear view of the structural members of FIG. 2 with the latching mechanism in the engaged position.

A receiver 28 is fixedly attached to a second structural member 12. The receiver 28 may be attached to the second structural member using any appropriate means, such as screws, welds or rivets. In the embodiment shown in FIG. 2, the receiver is attached to the structural member using rivets 34. The receiver 28 comprises a metal plate 30 extending upwardly in a direction generally perpendicular to the side of the structural member 12. The metal plate 30 has one or more holes 32a, 32b, 32c for receiving the spring latch hooks 16a, 16b on the latching device 14. In the embodiment shown in FIG. 2, the side of the metal plate distal to the first structural member 10 and the holes 32a, 32b, 32c are oriented at an angle to allow the first structural member 10 to be fastened to the second structural member 12 at a corresponding angle as shown in FIGS. 3 and 4. The holes in the receiver may be oriented at any desired angle such that the first structural member is attached to the second structural member at a corresponding angle. In one embodiment, the holes in the receiver are oriented in a line parallel to the second structural member to allow the structural members to be joined in a "T" shape with the first structural member substantially perpendicular to the second structural member.

As shown in FIGS. 2 and 3, in one embodiment, the receiver 28 includes upwardly bent tabs 42 that can engage outer surfaces of the first structural member 10 to align the structural members such that latch spring hooks 16a, 16b are aligned to engage the holes 32a, 32c in the metal plate 30 on receiver 28. The tabs also help to maintain the members in place, i.e., prevent lateral slip. In FIG. 4, a center tab 44 can be seen engaging the outer surface of the first structural member 10 in a corresponding depression in the first structural member to further help align the members.

In FIG. 2, the latch spring hooks are shown in the disengaged position. To fasten the first structural member 10 to the second structural member 12, the end of the first structural member is placed against the receiver 28 fixed to the second structural member 12. As shown in FIG. 3, operating means 40 is inserted through hole 18 into the center of the eccentric rotating members 26a, 26b. The operating means may be a conventional hexagonal operating tool, such as an Allen wrench, that is inserted into corresponding hexagonal openings in the rotatable parts. The interior surface of the rotatable parts 26a, 26b can have a different shape that allows insertion of a tool having a corresponding shape, or the rotatable parts can be rotated by some other means. Alternatively, the eccentric rotating members 26a, 26b may be joined by an axle having a shape in the internal portion of the axle corresponding to the shape of the operating tool.

When the operating tool 40 is rotated forward, the latch spring hooks 16a, 16b are rotated from the disengaged position (FIG. 2) to the engaged positon (FIG. 3) where the latch spring hooks 16a, 16b engage corresponding holes 32a, 32c in the metal plate 30 on receiver 28. Due to the eccentricity of the rotatable parts, further rotation of the rotatable parts 26a, 26b shortens the extension length of the latch spring hooks 16a, 16b, and the latch spring hooks move away from the receiver and stretch to exert a retractive or pulling force on the receiver 28 in a direction substantially parallel to the axis of the first structural member. This force maintains the first structural member 10 fastened to the second structural member 12.

The structural members can be separated by rotating the rotatable parts 26a, 26b in the opposite direction, which lengthens the extension of the latch spring hooks and releases the retractive force, releasing the clamping pressure on the receiver 28, and allowing latch spring hooks 16a, 16b to be released from the holes 32a, 32c in the receiver 28.

In other embodiments, the rotatable parts are on a common axle, so that the tool need only engage one end of the axle to rotate both rotatable parts simultaneously.

Figure 5:
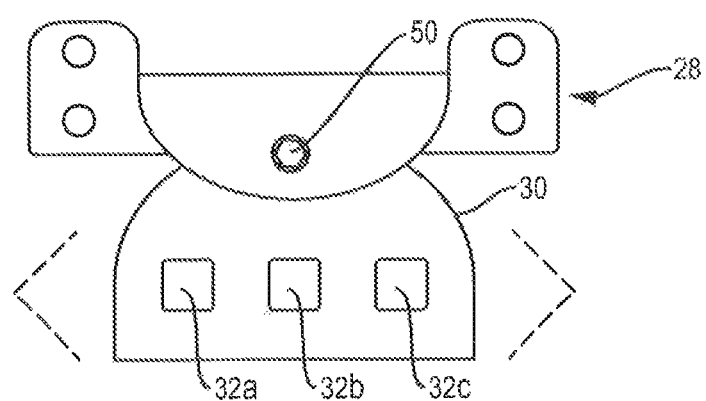
FIG. 5 is a top view of an embodiment of a receiver having a pivot to allow the structural members to be joined at multiple angles.

In another embodiment shown in FIG. 5, the metal plate 30 is mounted to the receiver 28 by a pivot 50. This allows the metal plate 30 to pivot such that the holes 32a, 32b and 32c can be aligned at any desired angle within its pivot range. This "universal" receiver avoids the need to manufacture different receivers for different attachment angles. The receiver may include a locking mechanism to lock the metal plate 30 in place at the desired angle.

Figure 6:
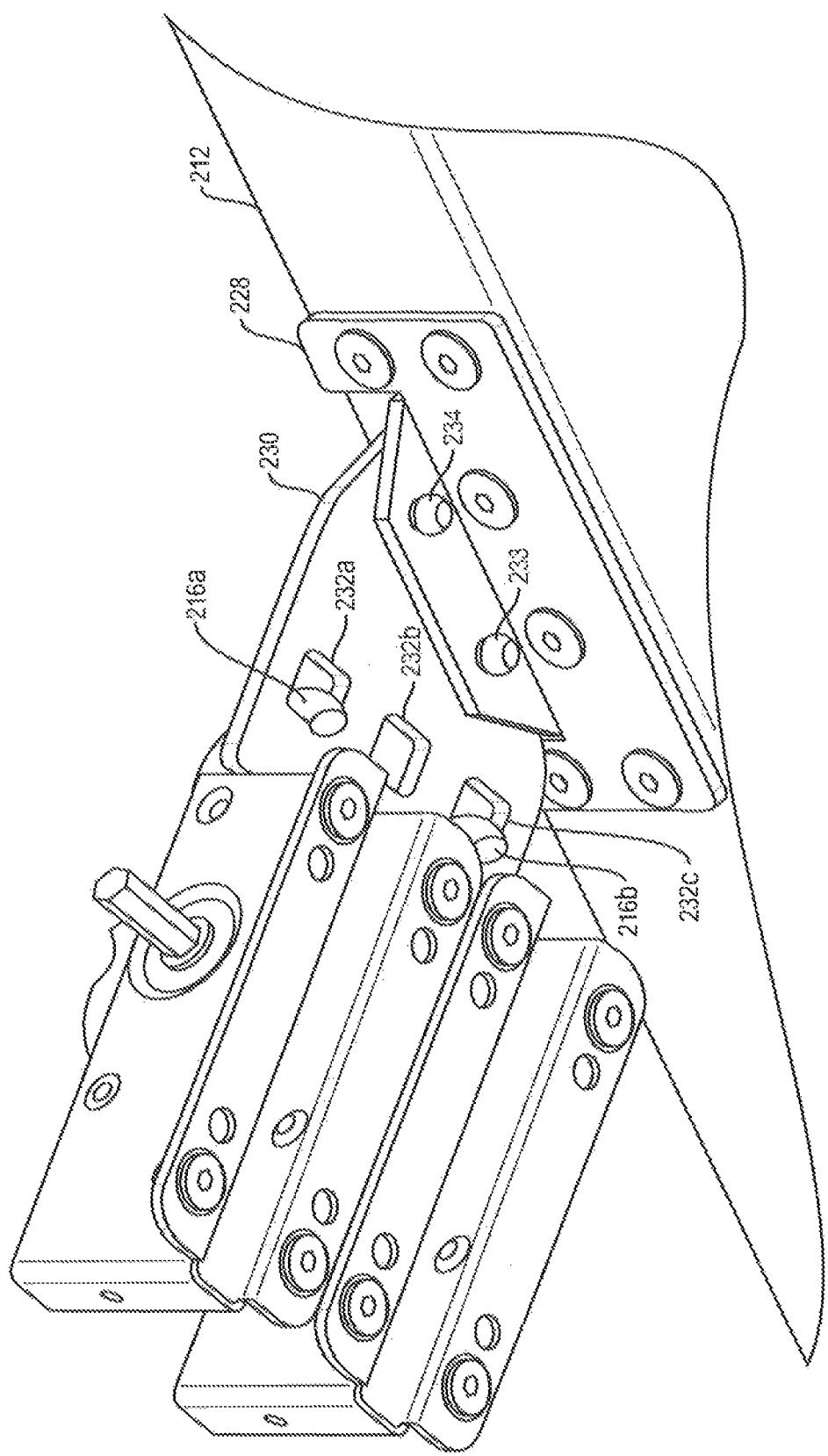
FIG. 6 is a bottom view of an embodiment of a receiver having a base portion for attachment to a structural member and plate fixedly attached to the base portion and having openings to receive latch spring hooks.
Figure 7:
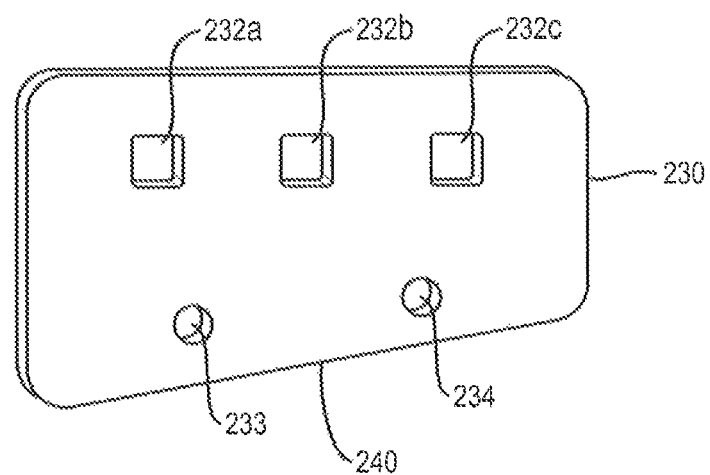
FIG. 7 is a top view of a metal plate for a receiver having an angled side for attachment to a base portion for attaching a first structural member at an angle to a second structural member.

In another embodiment of the receiver shown in FIGS. 6 and 7, the receiver comprises a base portion 228 that may be fixedly attached to a structural member 212. A plate 230 having openings 232a, 232b and 232c for receiving the latch spring hooks is fixedly attached to the base portion through holes 233, 234 using rivets, screws or any other attachment means known to those skilled in the art. In the embodiment shown in FIG. 6, the plate 230 is attached to the base portion 228 using rivets. As shown in FIGS. 6 and 7, the side 240 of the plate 230 attached to the base portion 228 may be angled to provide a corresponding angle on the opposite side of the plate distal to the structural member 212 when the plate is attached to the base portion, thereby allowing connection of a second structural member at the selected angle. By modifying the angle of the side 240 of the base plate 230, two structural member can be joined in an end-on manner at any desired angle.

While certain embodiments are described above, those skilled in the art should understand that the foregoing description is not intended to limit the spirit or scope of the present disclosure. It should also be understood that the embodiments of the present disclosure described herein are merely exemplary and that a person skilled in the art may make any variations and modification without departing from the spirit and scope of the disclosure. All such variations and modifications, including those discussed above, are intended to be included within the scope of the disclosure.

What is claimed is:

1. A fastening system comprising:
    at least one latching device configured to be mounted on a first structural member, and
    at least one receiver configured to be mounted to an external surface of a second structural member,
    wherein the at least one latching device comprises at least one eccentric rotatable part and at least one latch spring hook having a first end attached to the at least one rotatable part, wherein the receiver comprises a plate having one or more holes configured to receive a second end of the at least one latch spring hook when the receiver is mounted to an external surface of the second structural member,
    wherein the latching device and the receiver are configured such that the first structural member may be fastened to the second structural member when the receiver is mounted to an external surface of the second structural member, and
    wherein the receiver is configured such that at least a portion of the plate is receivable within the first structural member when fastened to the second structural member.

2. The fastening system of claim 1, wherein the latching device comprises a plurality of eccentric rotatable parts and latch spring hooks, and the receiver comprises a plurality of said holes configured to receive the plurality of latch spring hooks.

3. The fastening system of claim 2, wherein the plurality of eccentric rotatable parts are joined by an axle.

4. The fastening system of claim 1, wherein the receiver further comprises at least one tab configured to guide the first structural member into alignment to fasten the first structural member to the second structural member.

5. The fastening system of claim 4, wherein the at least one tab is configured to engage the first structural member to guide the first structural member into said alignment.

6. A fastening system comprising:
at least one latching device configured to be mounted on a first structural member, and
at least one receiver configured to be mounted on a second structural member,
wherein the at least one latching device comprises at least one eccentric rotatable part and at least one latch spring hook having a first end attached to the at least one rotatable part, wherein the receiver comprises a plate having one or more holes configured to receive a second end of the at least one latch spring hook,
wherein the latching device and the receiver are configured such that the first structural member may be fastened to the second structural member,
wherein the receiver is configured such that at least a portion of the plate is receivable within the first structural member when fastened to the second structural member, and
wherein the receiver further comprises a base portion and the plate is attached to the base portion by a pivot.

7. The fastening system of claim 6, wherein the one or more holes are located at a surface of the plate and the plate is pivotable about an axis that is oriented at an angle to said surface.

8. A fastening system comprising:
at least one latching device configured to be mounted on a first structural member, and
at least one receiver configured to be mounted on a second structural member,
wherein the at least one latching device comprises at least one eccentric rotatable part and at least one latch spring hook having a first end attached to the at least one rotatable part, wherein the receiver comprises a plate having one or more holes configured to receive a second end of the at least one latch spring hook,
wherein the latching device and the receiver are configured such that the first structural member may be fastened to the second structural member,
wherein the receiver is configured such that at least a portion of the plate is receivable within the first structural member when fastened to the second structural member, and
wherein the receiver comprises a base portion and the plate is fixedly attached to the base portion, wherein a side of the plate is angled.

9. The fastening system of claim 8, wherein said angled side of the plate is configured to orient the first structural member and the second structural member at a non-perpendicular angle relative to each other.

10. A method comprising the steps of:
fastening a first structural member to a second structural member, wherein the first structural member has at least one latching device mounted on the first structural member, wherein the at least one latching device comprises at least one eccentric rotatable part and at least one latch spring hook having a first end attached to the at least one rotatable part, wherein the second structural member has at least one receiver mounted to an external surface of the second structural member, wherein the receiver comprises a plate having one or more holes configured to receive a second end of the at least one latch spring hook and wherein the latching device and the receiver are configured such that the first structural member may be fastened to the second structural member,
wherein the fastening step includes
aligning the first structural member and the second structural member such that the at least one latch spring hook is aligned with a hole in the receiver,
rotating the rotatable part such that the second end of the at least one latch spring hook engages the hole in the receiver,
further rotating the rotatable part such that the at least one latch spring hook exerts a retractive force on the receiver, and
thereby securing the first structural member to the second structural member with the first structural member receiving therein at least a portion of the plate.

11. The method of claim 10, wherein the latching device comprises a plurality of eccentric rotatable parts and a plurality of latch spring hooks, and the receiver comprises a plurality of said holes configured to receive the plurality of latch spring hooks.

12. The method of claim 11, wherein the rotatable parts are rotated by inserting a rotating tool in the center of the rotatable parts.

13. The method of claim 12, wherein the eccentric rotatable parts are joined by an axle and the rotatable parts are rotated by inserting a tool in the axle.

14. The method of claim 10, wherein the receiver further comprises at least one tab configured to guide the first structural member into alignment to fasten the first structural member to the second structural member.

15. The method of claim 14, wherein the at least one tab is configured to engage the first structural member to guide the first structural member into said alignment.

16. The method of claim 15, further including engaging the first structural member with the at least one tab and thereby guiding the first structural member into said alignment.

17. A method comprising the steps of:
fastening a first structural member to a second structural member, wherein the first structural member has at least one latching device mounted on the first structural member, wherein the at least one latching device comprises at least one eccentric rotatable part and at least one latch spring hook having a first end attached to the at least one rotatable part, wherein the second structural member has at least one receiver mounted on the second structural member, wherein the receiver comprises a plate having one or more holes configured to receive a second end of the at least one latch spring hook, wherein the receiver further comprises a base portion and the plate is attached to the base portion by a pivot, and wherein the latching device and the receiver are configured such that the first structural member may be fastened to the second structural member,
wherein the fastening step includes
aligning the first structural member and the second structural member such that the at least one latch spring hook is aligned with a hole in the receiver, rotating the rotatable part such that the second end of the at least one latch spring hook engages the hole in the receiver, further rotating the rotatable part such that the at least one latch spring hook exerts a retractive force on the receiver, and thereby securing the first structural member to the second structural member with the first structural member receiving therein at least a portion of the plate.

18. The method of claim 17, wherein the one or more holes are located at a surface of the plate and the plate is pivotable about an axis that is oriented at an angle to said surface.

19. The method of claim 18, further including pivoting the plate about said axis and thereby securing the first structural member to the second structural member at a non-perpendicular angle relative to each other during the securing step.

20. A method comprising the steps of:

fastening a first structural member to a second structural member, wherein the first structural member has at least one latching device mounted on the first structural member, wherein the at least one latching device comprises at least one eccentric rotatable part and at least one latch spring hook having a first end attached to the at least one rotatable part, wherein the second structural member has at least one receiver mounted on the second structural member, wherein the receiver comprises a plate having one or more holes configured to receive a second end of the at least one latch spring hook, wherein the receiver comprises a base portion and the plate is fixedly attached to the base portion, wherein a side of the plate is angled, and wherein the latching device and the receiver are configured such that the first structural member may be fastened to the second structural member, wherein the fastening step includes aligning the first structural member and the second structural member such that the at least one latch spring hook is aligned with a hole in the receiver, rotating the rotatable part such that the second end of the at least one latch spring hook engages the hole in the receiver, further rotating the rotatable part such that the at least one latch spring hook exerts a retractive force on the receiver, and thereby securing the first structural member to the second structural member with the first structural member receiving therein at least a portion of the plate.

21. The method of claim 20, wherein said angled side of the plate is configured to orient the first structural member and the second structural member at a non-perpendicular angle relative to each other.

22. The method of claim 21, further including using the angled side of the plate to orient the first structural member to the second structural member at a non-perpendicular angle relative to each other, wherein the securing step includes securing the first structural member to the second structural member at said non-perpendicular angle relative to each other.

23. A fastening system comprising:

at least one latching device configured to be mounted on a first structural member, and at least one receiver configured to be mounted on a second structural member, wherein the at least one latching device comprises at least one eccentric rotatable part and at least one latch spring hook having a first end attached to the at least one rotatable part, wherein the receiver comprises a plate having one or more holes configured to receive a second end of the at least one latch spring hook, wherein the latching device and the receiver are configured such that the first structural member may be fastened to the second structural member, and wherein the receiver further comprises at least one tab spaced separately from the plate and configured to engage the first structural member to guide the first structural member into alignment to fasten the first structural member to the second structural member.

24. A fastening system comprising:

at least one latching device configured to be mounted on a first structural member, and at least one receiver configured to be mounted on a second structural member, wherein the at least one latching device comprises at least one eccentric rotatable part and at least one latch spring hook having a first end attached to the at least one rotatable part, wherein the receiver comprises a plate having one or more holes configured to receive a second end of the at least one latch spring hook, wherein the latching device and the receiver are configured such that the first structural member may be fastened to the second structural member, wherein the one or more holes are located at a surface of the plate, wherein the receiver further comprises a base portion and the plate is attached to the base portion by a pivot, and wherein the plate is pivotable about an axis that is oriented at an angle to said surface.

25. A fastening system comprising:

at least one latching device configured to be mounted on a first structural member, and at least one receiver configured to be mounted on a second structural member, wherein the at least one latching device comprises at least one eccentric rotatable part and at least one latch spring hook having a first end attached to the at least one rotatable part, wherein the receiver comprises a plate having one or more holes configured to receive a second end of the at least one latch spring hook, wherein the latching device and the receiver are configured such that the first structural member may be fastened to the second structural member, and wherein the receiver comprises a base portion and the plate is fixedly attached to the base portion, wherein a side of the plate is angled and configured to orient the first structural member and the second structural member at a non-perpendicular angle relative to each other.

26. A method comprising the steps of:

fastening a first structural member to a second structural member, wherein the first structural member has at least one latching device mounted on the first structural member, wherein the second structural member has at least one receiver mounted on the second structural member, and wherein the latching device and the receiver are configured such that the first structural member may be fastened to the second structural member, wherein the at least one latching device comprises at least one eccentric rotatable part and at least one latch spring hook having a first end attached to the at least one rotatable part, and wherein the receiver comprises a plate having one or more holes configured to receive a second end of the at least one latch spring hook, and at least one tab spaced separately from the plate and configured to engage the first structural member to guide the first structural member into alignment to fasten the first structural member to the second structural member, wherein the fastening step includes
- aligning the first structural member and the second structural member such that the at least one latch spring hook is aligned with a hole in the receiver,
- rotating the rotatable part such that the second end of the at least one latch spring hook engages the hole in the receiver,
- further rotating the rotatable part such that the at least one latch spring hook exerts a retractive force on the receiver, and
- thereby securing the first structural member to the second structural member.

27. The method of claim 26, further including engaging the first structural member with the at least one tab and thereby guiding the first structural member into said alignment.

28. A method comprising the steps of:
fastening a first structural member to a second structural member, wherein the first structural member has at least one latching device mounted on the first structural member, wherein the second structural member has at least one receiver mounted on the second structural member, wherein the latching device and the receiver are configured such that the first structural member may be fastened to the second structural member, wherein the at least one latching device comprises at least one eccentric rotatable part and at least one latch spring hook having a first end attached to the at least one rotatable part, wherein the receiver comprises a plate having one or more holes configured to receive a second end of the at least one latch spring hook, and a base portion, and wherein the one or more holes are located at a surface of the plate, the plate is attached to the base portion by a pivot, and the plate is pivotable about an axis that is oriented at an angle to said surface, wherein the fastening step includes
- aligning the first structural member and the second structural member such that the at least one latch spring hook is aligned with a hole in the receiver,
- rotating the rotatable part such that the second end of the at least one latch spring hook engages the hole in the receiver,
- further rotating the rotatable part such that the at least one latch spring hook exerts a retractive force on the receiver, and
- thereby securing the first structural member to the second structural member.

29. The method of claim 28, further including pivoting the plate about said axis and thereby securing the first structural member to the second structural member at a non-perpendicular angle relative to each other during the securing step.

30. A method comprising the steps of:
fastening a first structural member to a second structural member, wherein the first structural member has at least one latching device mounted on the first structural member, wherein the second structural member has at least one receiver mounted on the second structural member, wherein the latching device and the receiver are configured such that the first structural member may be fastened to the second structural member, wherein the at least one latching device comprises at least one eccentric rotatable part and at least one latch spring hook having a first end attached to the at least one rotatable part, wherein the receiver comprises a plate having one or more holes configured to receive a second end of the at least one latch spring hook, and a base portion, wherein the plate is fixedly attached to the base portion, and wherein a side of the plate is angled and said angled side of the plate is configured to orient the first structural member and the second structural member at a non-perpendicular angle relative to each other, wherein the fastening step includes
- aligning the first structural member and the second structural member such that the at least one latch spring hook is aligned with a hole in the receiver,
- rotating the rotatable part such that the second end of the at least one latch spring hook engages the hole in the receiver,
- further rotating the rotatable part such that the at least one latch spring hook exerts a retractive force on the receiver, and
- thereby securing the first structural member to the second structural member.

31. The method of claim 30, further including using the angled side of the plate to orient the first structural member to the second structural member at a non-perpendicular angle relative to each other, and wherein the securing step includes securing the first structural member to the second structural member at said non-perpendicular angle relative to each other.

32. A system comprising:
at least one latching device configured to be mounted on a first structural member; and
at least one receiver mounted to an external surface of a second structural member;
wherein the at least one latching device comprises at least one eccentric rotatable part and at least one latch spring hook having a first end attached to the at least one rotatable part, wherein the receiver comprises a plate having one or more holes configured to receive a second end of the at least one latch spring hook,
wherein the latching device and the receiver are configured such that the first structural member may be fastened to the second structural member, and
wherein the receiver is configured such that at least a portion of the plate is receivable within the first structural member when fastened to the second structural member.

* * * * *